(No Model.)
I. W. HEYSINGER.
PNEUMATIC TIRE.
No. 500,205. Patented June 27, 1893.
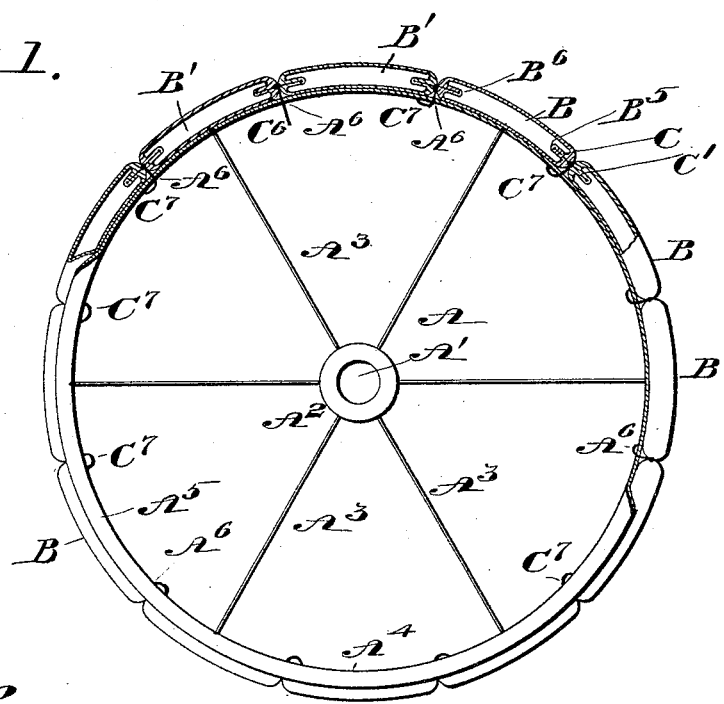
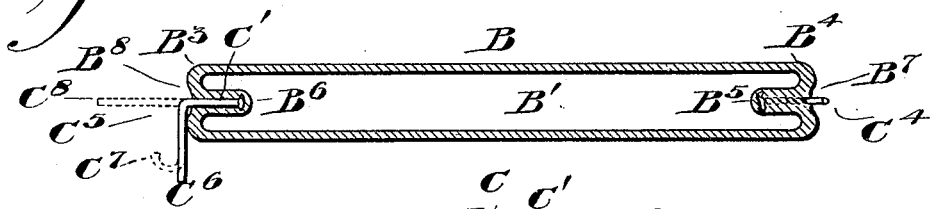
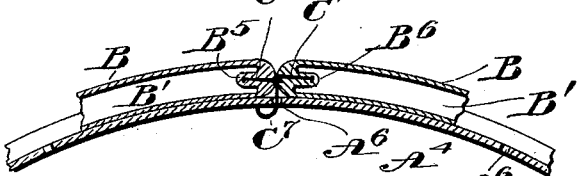
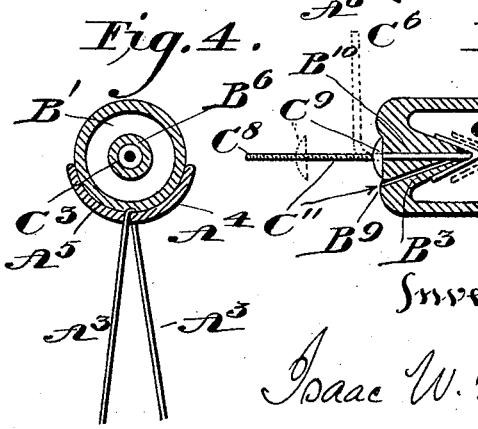
Witnesses:
M. B. Fenninger
H. White
Inventor:
Isaac W. Heysinger

UNITED STATES PATENT OFFICE.

ISAAC W. HEYSINGER, OF PHILADELPHIA, PENNSYLVANIA.

PNEUMATIC TIRE.

SPECIFICATION forming part of Letters Patent No. 500,205, dated June 27, 1893.

Application filed March 20, 1893. Serial No. 466,793. (No model.)

*To all whom it may concern:*

Be it known that I, ISAAC W. HEYSINGER, a citizen of the United States, residing at Philadelphia, in the county of Philadelphia and State of Pennsylvania, have made a certain new and useful Improvement in Pneumatic Tires for Vehicles, of which the following is a full, clear, and exact description, reference being had to the drawings which accompany and form a part of this specification, in which—

Figure 1 is a side view of a vehicle wheel, partly in plan, partly broken away, and partly in section, said wheel provided with a pneumatic tire in place which embodies my invention. Fig. 2 is a longitudinal vertical section through the middle of one of the sections of which my pneumatic tire is composed. Fig. 3 is a similar section of two adjacent sections of tire, and of the felly of the wheel beneath, the two sections of tire, and the felly of the wheel all bound together at the point of junction of said sections of tire with each other, and which constitutes a part of my invention. Fig. 4 is a transverse vertical section of a portion of Fig. 1, showing the felly, spokes, one section of my pneumatic tire, and its contained parts, all in place. Fig. 5 is an enlarged view of the junction of two sections of my pneumatic tire, looked at from above, in transverse longitudinal section; and Fig. 6 is a longitudinal section through the middle of a section of my pneumatic tire, showing a modification, whereby I am enabled to inflate each section at any time, when in use, and to any atmospheric pressure required.

The lettering in all the figures is uniform.

The object of my invention is to produce a pneumatic tire for bicycles, and other vehicles of like class, (in which air or other elastic gas is employed to produce a cushion inside a tubular tire composed of flexible material) in which the pressure of the vehicle upon the ground, by acting against the pneumatic tire at the point of contact of the wheel with the ground, may not transmit the pressure of contained air to the other portions of the pneumatic tire not in contact with the ground, and so impair the elastic cushion beneath, but in which the elasticity of each point of contact may be maintained at such point without distribution to other parts of the tire, and in which also a smooth continuous surface shall be practically applied to the ground by the rolling wheel, and also in which the tire may be more readily applied and more securely held to the felly of the wheel than in other devices of like character, and in which broken or damaged portions of the tire may be readily removed and a new part substituted therefor, and also to produce a pneumatic tire more cheaply than has heretofore been done, and one more durable in service, and effective in use.

My invention consists in making a pneumatic tire in hollow, elongated, and cylindrical sections of rubber or like material, of a suitable diameter to produce a proper tire for the vehicle upon which it is to be used, these sections being closed at the ends, and provided at their opposite ends with male and female means of attachment, so that they can be readily secured together, end to end, to form a long chain, or series of links, surrounding the felly of the wheel under the tension of the rubber of which the sections are composed, and which sections, or any one of them may be readily removed from the chain of sections, when desired, and a new one substituted therefor.

My invention also consists in providing, in combination with a tire composed of a chain of elongated, cylindrical, hollow rubber links, united together detachably at their free extremities, a series of supplemental attachments secured to the male and female attachments which join together each pair of links, or sections, and these supplemental attachments secured to the felly or other fixed part of the wheel, so that the tire will be fastened to the wheel at intervals, said intervals being the points of junction of said links, whereby each individual section is free to be compressed or expanded, under pressure, independently of the others, but is prevented from escape from said felly, and from "creeping" along the felly of the wheel under the traction of power applied to rotate the same.

My invention also consists in the use of means whereby I am enabled to inflate each or any of said links or sections, without reference to the others, to any atmospheric tension desired; and my invention also consists of the specific means whereby I form, unite, detach, and secure the said sections and the said wheel, and other specific devices which will be more particularly set forth hereinafter in this specification.

Referring to the drawings, A is a bicycle wheel, having hub, $A^2$, axle box, $A'$, spokes, $A^3 A^3$, and peripheral felly, $A^4$. The felly, $A^4$, is made externally concave, as shown in Fig. 4, and, at $A^5$, in Figs. 1 and 3. Around this felly, $A^4$, and within the concave groove, $A^5$, extends the pneumatic tire, B. The tire, B, is composed of a number of sections, each resembling the others, and constructed in like manner. They are cylindrical from end to end, and may have a diameter of two inches, and a length of from ten to twelve inches, more or less. The ends are rounded as shown in Fig. 1, so that when placed in contact end to end, they show a slight notch at the junctions where they are secured together. These sections are hollow, and I prefer to make them of soft, vulcanized rubber, which may be covered with fabric, vulcanized fast to the rubber during the process of manufacture, if preferred. These are vulcanized under internal gaseous pressure, from the decomposition of a chemical, by the heat of vulcanization, within the mold, or may be filled with atmospheric air under suitable pressure subsequent to completion.

As shown in Figs. 1, 2, 3, and 4, into one end of each section I insert a hook, $C'$ $C^5$, with a head, $C^3$, formed upon its inner end, to prevent it from being drawn through the head of the rubber section or cylinder. I bury the length and the head of this hook in an internal solid rubber stud, formed inside, the stem and head of the hook being vulcanized into the stud in the same manner as wire hooks are vulcanized into beer bottle stoppers, for instance. In this way no air can escape by traction upon, or play of the hook in the rubber cylinder, the joint being hermetical independently of the hook. At the opposite end of the cylinder or section, I insert, in like manner an eye, $C^4$, which I prefer to form of wire with a twisted neck, and spread ends, as shown at $C$ $C^2$ $C^4$, Fig. 5. This neck and its ends are also vulcanized into the solid stud, $B^6$, so that an air-tight cylinder is provided, irrespective of the motions of the eye, $C$ $C^4$. Of course the eye and stem may be formed of any suitable material, and not necessarily of twisted wire. It will now be seen that if two sections are placed with their opposite ends together, as in Fig. 3, the hook, $C^5$, of one may be passed down through the eye, $C^4$, of the other, and the two sections be secured together. I sometimes make these hooks like a simple closed hook, and use an independent clamp, of wire or the like, to secure them to the felly of the wheel, $A^4$. But I prefer to use the following means, as far more secure against shifting or "creeping" and simpler to make and to use. The felly is perforated, as shown at $A^6$, Fig. 3, and indicated at $A^6$ $A^6$, Fig. 1, at such intervals as will correspond with the length of each section, the perforations being along the bottom of the groove, $A^5$, and of a size to admit the passage of the hook or wire, $C^5$. The wire $C'$ $C^8$, Fig. 2, as originally inserted projects forward as a simple straight pin, $C^8$. A pair of round nosed pliers may be used to give the wire, $C'$, a short bend at right angles downward, just where it emerges from the rubber. As shown in Figs. 2, 4 and 5, the end of the rubber sections are slightly cupped in where the wires emerge to afford room for the hook and eye to engage without opening the sections by a space from each other. This cupping in is shown at $B^7$ and $B^8$, Figs. 2 and 5. These cups cause the ends of the sections to cushion against each other, as the hook and the eye in part occupy these cups, and make a smooth solid construction of the whole tire, without jar or rattle. The projecting wire, $C^8$, thus bent down at a right angle, is forced down through the eye, $C^4$, and finally through one of the perforations, $A^6$, of the felly, $A^4$, projecting below, as shown at $A^6$, $C^6$, Fig. 1. The same round nosed pliers, used to bend down $C^8$, now seizes $C^6$ and by a twist bends it around as shown at $C^7$ $C^7$, Fig. 1, forming a sort of slight hook beneath the felly, $A^4$. I prefer to bend these ends in the opposite direction from the wire stem, $C'$, thus making a sort of letter Z of the wire $C'$, hook $C^5$, and final bend $C^7$, as this more securely holds all the parts in place. This mode of attachment forms an exceedingly elastic joint, as the hook, $C^5$, can play in and out through the perforation, $A^6$, as the wheel revolves without strain or twist, within the limits of motion requisite.

To release a section, it is only necessary to bend back the wire, $C^7$, at two adjacent ends, and another of the wires, $C^7$, at the end of the section to be removed, when the wires, $C^5$ $C^5$, may be unstrung from their corresponding eyes, and the section removed, and a new one substituted. I make these wires, $C^5$, of a stiff but tough iron or steel so as to stand repeated bendings without breaking. It will be seen that a rider, by carrying in his pouch a couple of spare sections and a pair of pliers, can at any time replace a damaged section, upon a long journey, and that these spare sections can be readily mailed to any post office for a trifling amount of postage, so that they afford a great convenience in practical use.

In using this tire the points at which the sections come together, it will be seen, leave small convex notches. These may be avoided by forming the ends of the sections square, or cupped and fitted into each other, but it is not necessary, as under the weight of the rider they flatten so as to present no appreciable irregularity, especially as the ends, at $B^3$ and $B^4$, are thickened in their rubber where a partial end thrust is produced by the advance of the different sections toward the ground.

Instead of bending the ends, $C^6$, up as at $C^7$, Fig. 3, they may be secured by a screw thread upon the wire, $C^8$, and a small nut, $C^9$, as shown in Fig. 5, but these are apt to become displaced, and are in no wise as simple, cheap, or effective as the bending of the ends as shown.

The sections may be formed either straight, as shown in Fig. 2, or curved, as shown in Fig. 3, but I prefer to form them straight, so that, by simply reversing the hook, $C^5$, with a pair of pliers, the sections may be reversed, upside down, so that the outer, or worn side may be placed within the groove of the felly, and the new inner surface become the new traction surface. They may also be reversed end to end all around the wheel as the impact threatens to impair the forward end of each section from use. As the contacts with the wheel are at the ends of each section only, the curve may readily be made by drawing down the ends in fastening the wires, $C^4 C^5$, which will of itself increase the elasticity of the section.

While, as above stated, I prefer to make the sections charged with air or gas under pressure, in Fig. 6 I show a means whereby I am enabled to charge the sections with air at any pressure and at any time. The straight pin, $C'$, is, in this modification, carried inward entirely through the stud or support, $B^3$, and terminates in an externally concave valve, $C^{10}$, which closes over the inner end of the stud, $B^3$. By thrusting in the stem, $C^8$, $C'$, which is loosely seated in the rubber stud, $B^3$, in this modification, the inner end of the stud, $B^3$, is uncovered. A small lateral passage, $B^9$, opens externally eccentric to the passage of the stem, $C^8$, $C'$, and terminates internally near the stem, $C'$, and beneath the valve, $C^{10}$. A syringe provided with a nozzle like an oil can is inserted into the passage, $B^9$, in the rubber, and air is forced into the cylinder, $B'$, the valve, $C^{10}$, having been pushed inward by means of the stem, $C^8$. When a sufficient pressure of air has been obtained the valve and stem, $C^{10} C^8$, are retracted, the cup $C^{10}$ of the valve closing over the pointed end of the stud, and closing the inner end of the passage, $B^9$, and the space surrounding the stem, $C'$, if there be such. I show the stem, $C^8$, screw threaded. The small nut, $C^9$, is then run up the stem, $C^8$, to bear tightly against the cup of the cylinder end, as shown, and the stem bent off at right angles, as shown in dotted outline, at $C^6$, leaving room for the corresponding eye of the adjacent section between hook, $C^6$, and nut, $C^9$, so that, when hooked into the corresponding eye, the nut, $C^9$ will be prevented from unscrewing, and the valve, $C^{10}$, be securely held in place. To renew the charge the bend of $C^6$ is straightened, the nut, $C^9$, run back to its position shown in dotted outline, and the cylinder recharged. The nut, $C^9$, may be dispensed with, if the bend of $C^6$ and the eye corresponding thereto make a firm abutment against the end of the cylinder, or the nut, $C^9$, as above described may be used to secure the screw-threaded end of, $C^8$, beneath the felly of the wheel, instead of the bent end, $C^7$, but I do not prefer it.

I do not in this invention rigidly confine myself to the precise form and construction herein shown and described, but vary the same to suit special requirements, as would be done by any skilled mechanic, without departing from the principles and scope of my invention as herein shown, described, and claimed.

Having now described my invention, what I claim, and desire to secure by Letters Patent, is—

1. As an article of manufacture a pneumatic tire for vehicle wheels consisting of a series of elongated, cylindrical, hollow, and flexible sections charged or adapted to be charged with an elastic gas under pressure, said sections having rounded ends, and substantially cylindrical external surfaces, and adapted to be so applied to or replaced on said wheel, at different times, as to present different sides of said cylinder or cylinders as wearing surfaces in contact with the ground, and said sections detachably secured together by fastenings seated in the opposite ends thereof and secured at said ends to the wheel around the periphery of which they are extended in a continuous chain, substantially as described.

2. A pneumatic tire for vehicles consisting of a series of disconnected air chambers, cylindrical, compressible, and charged or adapted to be charged with air under pressure, said series surrounding the wheel of said vehicle, and adapted to interpose continuously an elastic, pneumatic cushion between said wheel and the ground, during the rotation of said wheel, said hollow cylinders secured to each other by fastenings seated longitudinally in the faces of their adjacent opposite ends, and secured to the felly of said wheel at points opposite said fastenings of said sections, said cylinders detachable and replaceable upon said felly in different positions, and having two or more external surfaces along different sides thereof adapted, when thus replaced in different positions, to be successively or interchangeably used as wearing surfaces, substantially as described.

3. A vehicle tire consisting of a series of elongated, cylindrical, elastic sections, joined together at their opposite ends, by means of longitudinal fastenings seated in the middle of said ends, and said fastenings secured at said ends to the felly of the wheel of said vehicle, in combination with an externally grooved felly, adapted to receive said series of elastic sections, and means for securing said fastenings of said sections, thereto at the terminations thereof, to said wheel, substantially as described.

4. In combination with wheel, A, having peripheral felly, $A^4$, the series of elongated, cylindrical sections, hollow, elastic, and charged or adapted to be charged with a gas under pressure, said series of sections joined together at their adjacent opposite ends, by fastenings longitudinally seated in said ends and adapted to form a continuous chain of sections around said wheel, said sections having external surfaces adapted to be presented externally with either one side or another as a wearing surface in contact with the ground, and having no fastenings or other external obstructions along the cylindrical external surfaces thereof, together with means whereby the opposite ends of said adjacent sections are secured to the periphery of said wheel, and in opposition to each other, by means of perforations in the periphery of said wheel beneath the points of attachment of said sections, and fastenings extended from said perforations to the attachments between said adjacent sections, substantially as described.

5. As an article of manufacture a series of elongated, flexible, hollow, and elastic cylinders, filled or adapted to be filled with air under pressure, and having attachments seated longitudinally in the opposite ends of each cylinder, and adapted to engage with like attachments of adjacent sections, against longitudinal strain, by means of which the said cylinders are adapted to be detachably connected together in a continuous, closed chain of sections, independently of any attachment of said cylinders to the periphery of a wheel, said series adapted to form a pneumatic tire when applied to the external surface of the periphery of a wheel of a vehicle, and suitably secured thereto, substantially as described.

6. A pneumatic tire for vehicle wheels consisting of a series of elongated, hollow, cylindrical sections, secured to each other, end to end, by fastening devices longitudinally seated in their extremities, and secured to the externally concave felly of said wheel, by fastenings connecting the attaching devices of adjacent sections with said felly, and adapted to form a continuous pneumatic tire for said wheel, each of said cylindrical sections adapted to be turned or reapplied upon said felly independently of the others, so as to present a new longitudinal wearing surface, as one or another portion of said series, or of any individual cylinder thereof, is worn or injured in use substantially as described.

7. In a pneumatic vehicle tire composed of a series of elongated, inflated cylinders, the cylinders B, B, having internal air spaces, B', B' and opposite attaching devices, $C^4$ at one end, and $C^5$ at the opposite end of said cylinders, so constructed that said attachments at the adjacent ends of the successive cylinders of the series, may be secured together to form a continuous chain of separate sections around the wheel of said vehicle, substantially as described.

8. In a sectional pneumatic tire for the wheels of vehicles, a series of elongated cylders, B, B, B, extended around said wheel, said cylinders hollow, flexible, and charged or adapted to be charged with elastic gas under pressure, said cylinders provided with a hook, $B^5$, at one end, and an eye, $B^4$, at the opposite end, so constructed that said hook and eye of adjacent ends of successive sections may be hooked into each other to form the cylinders in a continuous closed chain around the periphery of said wheel, substantially as described.

9. In a sectional pneumatic tire for vehicle wheels, in combination with externally grooved felly, $A^4$ $A^5$, pierced at $A^6$, $A^6$, $A^6$, at intervals corresponding to the length of the sections of said tire, the hollow, elongated, inflated sections B, B, B, adapted to be charged and maintained with air under pressure, said cylinders provided at their opposite ends with fittings adapted to mesh into each other and join said sections together in a continuous series, together with metallic fastenings, $C^6$, $C^6$, secured to the fittings of said cylinders and adapted to pass through said felly of said wheel, at the perforations, $A^6$ $A^6$, and at intervals secure the said sections to said wheel, substantially as described.

10. In a sectional pneumatic vehicle wheel tire, the series of detachable sections, B, B, B, each consisting of an elongated, flexible, elastic cylinder, provided at their opposite ends with fittings adapted to mesh into each other, and a part of said fitting, $C^6$, adapted to project internally, in combination with an externally concave felly, $A^4$ $A^5$, having a series of perforations, $A^6$, $A^6$, $A^6$, adjacent to said fittings, $C^4$ $C^5$, and said projection, $C^6$, adapted to enter said perforations, $A^6$, $A^6$, $A^6$, and be secured therein, as shown at $A^6$ $A^7$, substantially as described.

11. A cylinder, B, adapted to form part of a series of like sections the whole forming a continuous pneumatic vehicle wheel tire, consisting of an elongated, hollow, flexible cylindrical tube, hermetically closed and charged or adapted to be charged with air or other gas under pressure, the opposite ends of said cylinder provided with metallic fastenings seated longitudinally in said ends, one male and the other female, and adapted to mesh into the like attachments upon longitudinally adjacent cylinders, in said series, so as to join said sections, end to end, and prevent the same from being drawn apart by end strain or pull thereupon, said attachments molded into the ends of said cylinders during the process of molding said cylinders of vulcanized rubber or the like, and projecting longitudinally at the ends thereof, substantially as described.

12. In a cylinder, B B', adapted to form part of a sectional pneumatic vehicle wheel tire, the hollow flexible body, B, interior chamber, B', internal studs, $B^5$ $B^6$, at opposite ends of said chamber, B', hook C', $C^6$, having internal head, $C^2$, molded in said stud $B^6$, and eye, C, $C^4$, and internal head, $C^3$, molded in said stud, $B^5$, the ends projecting from near the center of each end of said cylinder, and adapted to engage with corresponding hook or eye of adjacent cylinders in the same series, and to be detached from the same by unhooking said hook from said eye, substantially as and for the purposes set forth.

13. In a sectional pneumatic vehicle wheel tire, in combination with felly, $A^4$, having external flanges, $A^5$ $A^5$, and contained groove, and perforations along the bottom of said groove, $A^6$, $A^6$, $A^6$, the series of elongated, hollow, flexible and inflated cylinders, B, B, B, each of said cylinders provided with a central eye, $C^4$, projecting from one end of said cylinder, and a corresponding hook from the opposite end, $C^5$, said hook, $C^5$, having part, $C^6$, bent downward at right angles to the axis of said cylinder, and adapted to pass through eye, $C^4$, of next adjacent cylinder, and thence continuously down through perforation, $A^6$, of felly, $A^4$, and secured, at $C^7$, by a stop upon the hook, $C^5$, whereby, under compression of said cylinders in use, the stem of said hook may be enabled to reciprocate vertically in said perforation, $A^6$, and relieve strain upon the ends of said cylinders, and at the same time prevent longitudinal or lateral motion of said sections upon the felly, $A^4$, substantially as described.

14. In a sectional pneumatic vehicle wheel tire, composed of a series of substantially similar elastic, hollow, elongated, rubber cylinders, charged and maintained with gas under pressure, the cylinder, B, B', having eye, $C^4$, secured in one end thereof, and projecting therefrom, and the hook, $C^5$, secured in the opposite end of said cylinder, and projecting therefrom, the stem of said hook formed of a stiff but ductile metal, and projecting downward toward the center of said wheel, and through perforation, $A^6$, in the felly, $A^4$, thereof, after being passed through a corresponding eye of the longitudinally adjacent cylinder of said series, the free end of said hook, extended through said felly, bent, by a short bend, under said felly, and beyond the margins of said perforation, $A^6$, so as to produce a vertically flexible, and laterally and longitudinally rigid joint, substantially as and for the purposes described.

15. As an article of manufacture a cylinder for sectional pneumatic vehicle wheel tires, consisting of an elongated hollow body, B, forming a curved or straight cylinder, in the ends of which are secured, at opposite ends, a male and female attachment, one at each end, and adapted to mesh into like opposite attachments of longitudinally adjacent sections, the ends of said section cupped in at the centers thereof, and said hook and eye projecting externally within the said cupped portions, so that when adjacent sections are hooked together, in a series, the body of the cylinders will present flush against the bodies of longitudinally adjacent cylinders, the hook and eye attachment concealed within said cupped portions at the ends of said cylinders, substantially as and for the purposes described.

16. As an article of manufacture a cylinder for sectional pneumatic vehicle wheel tires, consisting of india rubber body, B, vulcanized, internal chamber, B', said cylinder having rounded ends, and the rubber body thickened at said ends, $B^3$, $B^4$, attachments, $C^4$ $C^5$, vulcanized in the rubber centrally at opposite ends, and adapted to form connection with the like attachments of longitudinally adjacent cylinders, said cylinders adapted to the felly, $A^4$, of wheel, A, and to be secured thereto, substantially as described.

17. In a cylinder adapted to form part of series of like cylinders in the construction of a sectional pneumatic tire for vehicle wheels, said cylinder elongated, flexible, and charged with or adapted to be charged with an elastic gas under pressure, the eye, $C^4$, projecting from one end of said cylinder, and hook, or its equivalent, $C^5$, projecting from the opposite end of said cylinder, and internal stud, $B^3$, the stem of said hook, or eye, $B^{10}$, extended through said stud and having internal conical valve upon the inner portion thereof, secured to said stem, and a lateral passage, $B^9$, through said stud, $B^3$, from the external air to the chamber, B', of said cylinder, said stem, $B^{10}$, $C^8$, adapted to be thrust inward so as to uncover the inner entrance of said passage, $B^9$, said cylinder then adapted to be filled by air forced, from a suitable instrument, through said passage, $B^9$, and said passage then closed by withdrawing said stem and its attached valve, said stem, $C^8$ $B^{10}$, adapted to form one of the attachments of said cylinder to the corresponding attachment of the next longitudinally adjacent cylinder of said series, substantially as described.

18. In combination with rubber cylinder, B, internal chamber, B', internal stud, $B^3$, valve stem, $C^8$ $B^{10}$, extended externally through said stud, and having valve head, $C^{10}$, secured to the inner portion of said stem, lateral passage, $B^9$, closed internally by said valve, and nut, $C^9$, operated upon screw threaded stem, $C^8$, said stem, $C^8$, adapted to be bent at right angles, as shown at $C^6$, to form a hook, or otherwise adapted to be secured to an opposite attachment of a longitudinally adjacent and similar cylinder, the said nut, $C^9$, and valve, $C^{10}$, held in place by the traction of said cylinders and their attachments upon each other, when formed in a continuous series and adapted to make a sectional pneumatic tire around the periphery of the wheel of a vehicle to which they are adapted to be secured, substantially as described.

ISAAC W. HEYSINGER.

Witnesses:
JOHN R. NOLAN,
M. B. FENNINGER.